(12) United States Patent
Appajodu et al.

(10) Patent No.: US 8,301,686 B1
(45) Date of Patent: Oct. 30, 2012

(54) SYSTEMS AND METHODS FOR DECENTRALIZED COMPUTING

(75) Inventors: Shanmuga Appajodu, San Jose, CA (US); Michael K. Larkin, San Jose, CA (US); Srihari Kumar, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 664 days.

(21) Appl. No.: 12/002,725

(22) Filed: Dec. 17, 2007

Related U.S. Application Data (60) Provisional application No. 60/923,826, filed on Apr. 16, 2007.

(51) Int. Cl.
*G06F 15/16* (2006.01)
(52) U.S. Cl. ............................................ 709/201; 718/1
(58) Field of Classification Search .................. 709/201; 718/1
See application file for complete search history.

(56) References Cited

U.S. PATENT DOCUMENTS

| | | | |
|---|---|---|---|
| 6,842,777 B1 * | 1/2005 | Tuli ............................... | 709/217 |
| 6,947,965 B2 * | 9/2005 | Glass ............................. | 709/203 |
| 6,970,866 B1 * | 11/2005 | Pravetz et al. ......................... | 1/1 |
| 7,320,024 B2 * | 1/2008 | Oku ............................... | 709/217 |
| 7,356,679 B1 * | 4/2008 | Le et al. ............................. | 713/1 |
| 7,424,709 B2 | 9/2008 | Neiger et al. | |
| 8,073,926 B2 * | 12/2011 | Traut et al. ..................... | 709/203 |
| 2002/0010756 A1 * | 1/2002 | Oku ............................... | 709/217 |
| 2002/0147810 A1 | 10/2002 | Traversat et al. | |
| 2003/0028612 A1 | 2/2003 | Lin et al. | |
| 2003/0041106 A1 * | 2/2003 | Tuli ............................... | 709/203 |
| 2003/0054810 A1 | 3/2003 | Chen et al. | |
| 2003/0177170 A1 * | 9/2003 | Glass ............................. | 709/203 |
| 2004/0179537 A1 | 9/2004 | Boyd et al. | |
| 2005/0004968 A1 | 1/2005 | Mononen et al. | |
| 2005/0021695 A1 * | 1/2005 | Takamine ..................... | 709/220 |
| 2005/0021788 A1 | 1/2005 | Tucker et al. | |
| 2005/0114448 A1 | 5/2005 | Skomra | |
| 2005/0198303 A1 * | 9/2005 | Knauerhase et al. ......... | 709/227 |
| 2005/0246453 A1 | 11/2005 | Erlingsson et al. | |
| 2005/0289216 A1 * | 12/2005 | Myka et al. .................... | 709/201 |
| 2006/0021029 A1 | 1/2006 | Brickell et al. | |
| 2006/0155674 A1 * | 7/2006 | Traut et al. ........................ | 707/2 |
| 2006/0155931 A1 | 7/2006 | Birrell et al. | |
| 2007/0050770 A1 | 3/2007 | Geisinger | |
| 2009/0025006 A1 | 1/2009 | Waldspurger | |

OTHER PUBLICATIONS

Sapuntzakis, S.P. et al., "Optimizing the Migration of Virtual Computers," 2002, ACM SIGOPS Operating Systems Review, vol. 36, pp. 377-390.

* cited by examiner

*Primary Examiner* — Wing Chan
*Assistant Examiner* — Kostas Katsikis
(74) *Attorney, Agent, or Firm* — Banner & Witcoff, Ltd.

(57) ABSTRACT

Methods and systems for providing decentralized computing are provided. An exemplary method includes generating one or more virtual machine images including at least one application and a virtual machine, associating the one or more virtual machine images with user information, receiving user information from a digital device, selecting one or more associated virtual machine images based on the user information, and providing the one or more virtual machine images to the digital device.

15 Claims, 6 Drawing Sheets

SYSTEMS AND METHODS FOR DECENTRALIZED COMPUTING

CROSS-REFERENCE TO RELATED APPLICATIONS

This application claims the benefit of U.S. Provisional Patent Application Ser. No. 60/923,826, filed on Apr. 16, 2007, entitled "System and Method for Decentralized Computing," which is hereby incorporated by reference.

The present application is related to U.S. Nonprovisional patent application Ser. No. 11/525,726, filed on Sep. 22, 2006, entitled "Hot Pluggable Virtual Machine," and U.S. Nonprovisional patent application Ser. No. 11/525,727, filed on Sep. 22, 2006, entitled "Dynamic Table Configuration in a Virtual Machine," which is hereby incorporated by reference.

BACKGROUND

1. Field of the Invention

Embodiments of the present invention relate generally to computing, and more particularly to systems and methods for decentralized computing.

2. Description of Related Art

Data centers using centralized computing and centralized storage have traditionally suffered from lack of scalability. For example, limitations in capacity and performance can greatly limit the effectiveness of data centers. Capacity problems include the difficulty of adding server capacity to accommodate increased demand. Although additional servers can usually be added to a data center, adding servers increases the total cost of ownership of the data center which may include increased costs of space, heat dissipation, and energy consumption.

In one example, data centers may act as application servers or webservers. As the numbers of users grow, increased demands are placed on network bandwidth as well as processor performance. One solution is to add additional servers or blades, however, this increases costs including at least those costs described above.

To solve these problems, some organizations choose to configure each computer manually. An IT department may configure each computer by hand and may push updates over a network to individual computers. However, as the numbers of users grow, the number of programs that require updates and patches also grow. Managing, organizing, and pushing the updates and patches places strenuous demands on network bandwidth and processor power and is not cost effective for enterprises.

To solve some of these problems, some organizations have limited the number and type of applications allowed on a computer. In this model, the user has no control over the machine and is not allowed to personalize the machine with applications or settings that are different from another user. As a result, users are unable, to customize workspaces, add applications, or change settings which may make them more efficient.

SUMMARY

Methods and systems for providing decentralized computing are provided. An exemplary method includes generating one or more virtual machine images including at least one application and a virtual machine, associating the one or more virtual machine images with user information, receiving user information from a digital device, selecting one or more associated virtual machine images based on the user information, and providing the one or more virtual machine images to the digital device. The virtual machine image may configure the digital device to locally execute the at least one application via a virtual machine manager.

The digital device may comprise a processor and a memory containing an operating system. The digital device may also comprise a virtual machine manager. Generating one or more virtual machine images may include removing an operating system file and/or personal information from the at least one application. Providing the one or more virtual machine images to the digital device may comprise configuring the digital device to execute the at least one application via the virtual machine when the digital device is offline.

The method may further comprise encrypting one or more virtual machine images. Similarly, the method may comprise encrypting the communication to the digital device and/or authenticating the user information. The method may also comprise updating the one or more virtual machine images with at least one document received from the digital device.

A computer readable medium may have embodied thereon instructions executable by a processor, the instructions containing an exemplary method for providing decentralized computing. The method may comprise generating one or more virtual machine images including at least one application and a virtual machine, associating the one or more virtual machine images with user information, receiving user information from a digital device, selecting one or more associated virtual machine images based on the user information, and providing the one or more virtual machine images to the digital device.

An exemplary system for providing decentralized computing comprises an image creation module, a network interface, and an image distribution module. The image creation module may be configured to generate one or more virtual machine images including at least one application and a virtual machine and associating the one or more virtual machine images with user information. The network interface may be configured to receive user information from a digital device. The image distribution module may be configured to select one or more associated virtual machine images based on the user information and provide the one or more virtual machine images to the digital device.

DETAILED DESCRIPTION

Systems and methods are provided for decentralized computing. A server can provide one or more virtual machine images (or components thereof) to the host device. The virtual machine image includes at least one virtual machine, at least one application, settings, and other data that may be used to configure the host device to be able to locally execute the applications through a virtual machine manager.

In one example, a server provides one or more virtual machine images to the host device. The host device may include any device with a processor and memory. The memory may include an operating system. Once components of the virtual machine image are installed, the host device may run the applications locally through a virtual machine manager. The virtual machine manager manages the system and resource calls of the applications provided from the virtual machine image. In one example, the virtual machine manager routes the application's call of an application program interface (API) to the operating system. The virtual machine manager and the virtual machine is further discussed in the nonprovisional application Ser. No. 11/525,727, filed on Sep. 22, 2006, entitled "Dynamic Table Configuration in a Virtual Machine" hereby incorporated by reference.

Figure 1:
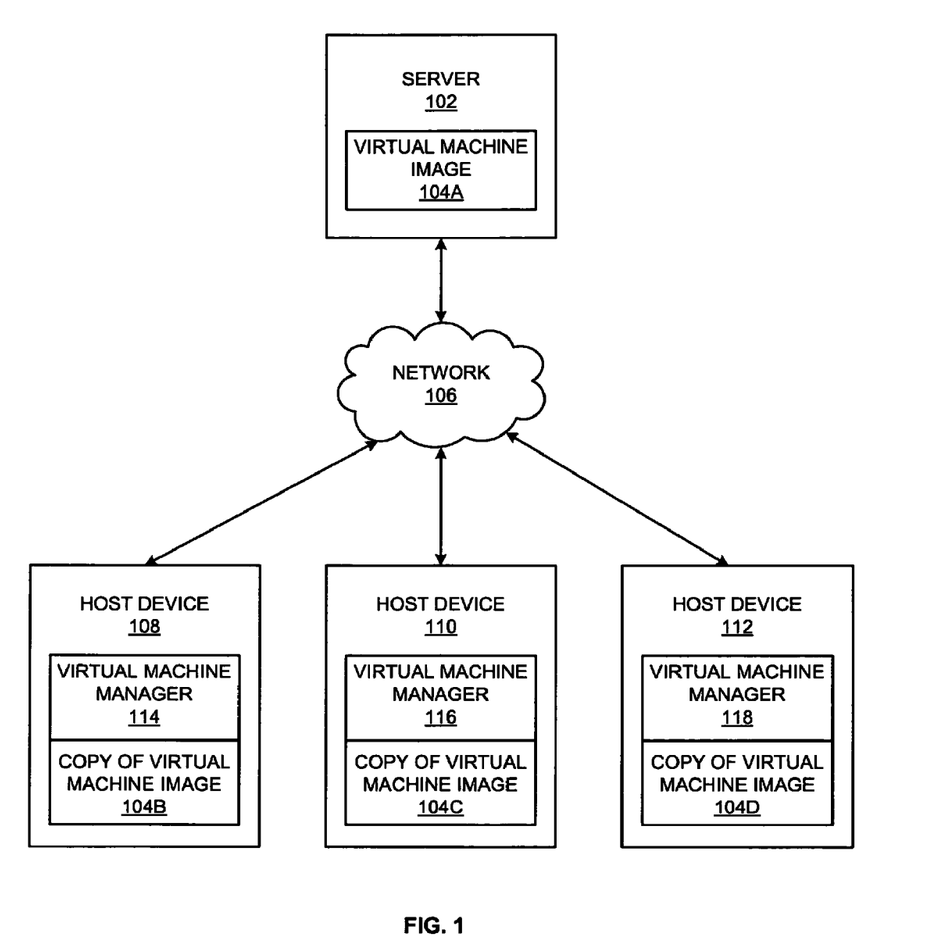
FIG. 1 is a block diagram of a decentralized computing system according to some embodiments.

FIG. 1 is a block diagram for providing decentralized computing according to some embodiments. The decentralized computing system may comprise a server 102 and host devices 108, 110, and 112 which are coupled to a network 106. Although FIG. 1 depicts three host devices (i.e., 108, 110, and 112) and one server (i.e., 102) for simplicity, there may be any number of the host devices and any number of servers in exemplary embodiments.

The server 102 and the host devices 108, 110, and 112, comprise digital devices. A digital device is any device with a processor. In some examples, the server 102 may comprise a file server, applications server, web server, email server, and/or any other kind of server. In some embodiments, the server 102 comprises a data center (e.g., a plurality of servers and/or blades). The digital device is further discussed in FIG. 6.

The host devices 108, 110, and 112 may comprise computers. Alternately the host devices 108, 110, and 112 may comprise workstations, cellular telephones, personal digital assistants, or any digital device. The host devices 108, 110, and 112 may each comprise the same type of digital device (e.g., a computer) or different digital devices. In one example, the host device 108 and host device 110 comprise computers while the host device 112 comprises a personal digital assistant.

The network 106 may comprise a single network or any number of networks. Further, the network 106 may be, for example, a Wide Area Network (WAN) such as the internet and/or a Local Area Network (LAN). The network 108 may also be a telephone network, a WIFI wireless network according to Institute of Electrical Engineers (IEEE) standards 802.11a/b/g/n or other such wireless local area network standards, or a Wi-Max network according to IEEE standard 802.16 or another such wireless broadband standard.

The server 102 comprises a virtual machine image 104A. A virtual machine image 104A is an image comprising a virtual machine as discussed herein. An image is any kind of file, application, and/or operating system that is configured to be transferred to a digital device (e.g., host device 108, 110, and/or 112). An image may comprise a single file or many files. In some embodiments, an image comprises a disk image. A disk image is at least one computer file containing the complete contents and structure of a computer readable medium or device, such as a hard drive, CD, or DVD. In other embodiments, the image comprises an image of an application such as a word processing application or browser. The image of the application may contain files necessary to execute the application. The image may comprise any number of applications. Further, the image may be compressed and/or encrypted.

Each host device 108, 110, and 112 comprises a virtual machine manager 114, 116, and 118, respectively. The virtual machine managers 114, 116, and 118, are configured to execute the applications contained within the copy of the virtual machine image 104B, 104C, and 104D, respectively.

In some embodiments, the virtual machine image 104A is generated and stored on the server 102. The virtual machine image 104A may include an application, which may be a software program or tool such as MICROSOFT® WORD®. In various embodiments, at least some data including settings needed by the application to be executed may also be included in the virtual machine image 104A. In one example, the virtual machine image comprises data such as settings needed to execute an application on a digital device with a preinstalled operating system.

Although the server 102 is depicted as comprising a single virtual machine image 104A, the server 102 may comprise any number of virtual machine images. In some embodiments, the server 102 may generate a single virtual machine image from a plurality of virtual machine images and transfer the generated image to one or more host devices.

Similarly, although the host devices 108, 110, and 112 are depicted as comprising a single copy of virtual machine image 104B, 104C, and 104D, respectively, the host devices may comprise any number of virtual machine images. In some embodiments, the host device 108, 110, and 112 may comprise any number of similar or different virtual machine images.

In various embodiments, the host devices 108, 110, and 112 do not receive the virtual machine image from the server 102. Rather, the host devices 108, 110, and 112 may receive instructions, files, directories, and/or other data from the virtual machine image on the server 102.

Instructions, files, directories, and/or other data are referred to herein as components of the virtual machine image (s). Instructions may represent any data including registry settings, scripts to update operating system files on the host device, instructions, or any other information.

By providing the instructions, files, directories, and/or other data to the host devices to locally execute the applications through the virtual machine and the virtual machine manager, the network 106 and server 102 may be relieved of performance and capacity lags when compared to application servers or web-based applications.

In some embodiments, the virtual machine images may be patched and updated as necessary thereby providing a centralized approach to management of applications and data (e.g., settings) for all host devices associated with the system. For example, when an application such as MICROSOFT® OFFICE® is updated, a single virtual machine image that is the standard for a company may be updated and then the updated virtual machine images may be distributed to the host devices. Similarly, anti-virus, security software, and other upgrades may be supplied to the host devices through updating one or more virtual machine images at the server.

Figure 2:
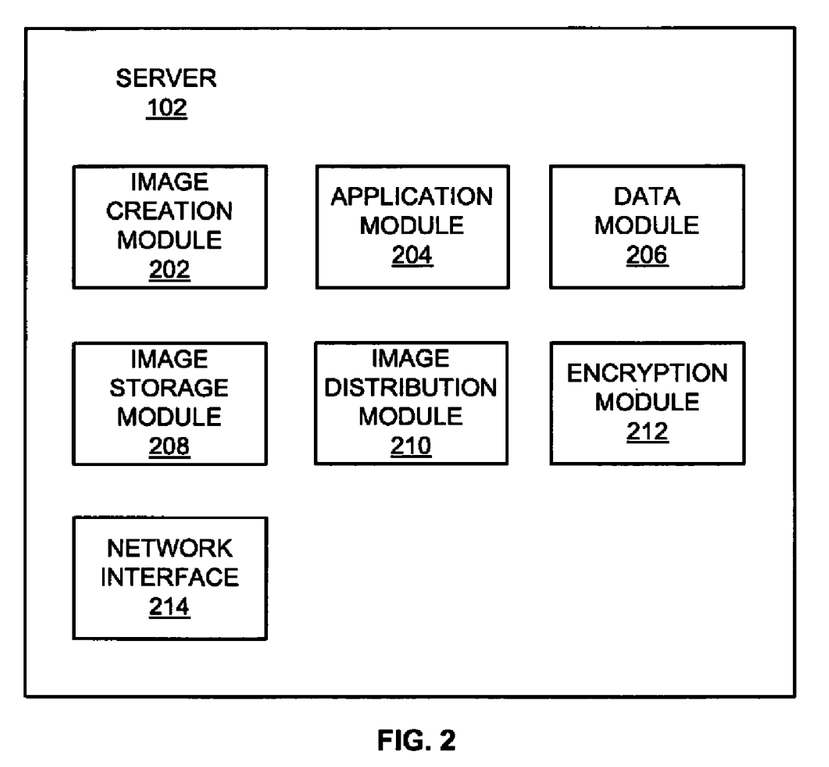
FIG. 2 is a block diagram of an exemplary implementation illustrating modules of the server, according to various embodiments.

FIG. 2 is a block diagram of an exemplary server 102, according to various embodiments. The server 102 includes an image creation module 202, an application module 204, a data module 206, an image storage module 208, an image distribution module 210, an encryption module 212, and a network interface 214.

The image creation module 202 comprises one or more software tools to allow user (e.g., a system administrator) to generate the virtual machine image. The image creation module 202 may generate the virtual machine image to include at least one virtual machine and at least one application, so that the application can be executed by a host device receiving a copy of the virtual machine image. In one example, the host machine can execute the application once the copy of the virtual machine image (or components of the virtual machine image) is executed using the virtual machine manager.

The application module 204 and the data module 206 may assist the image creation module 202 in generating the virtual machine image. In various embodiments, the application module 204 prepares applications to be included in one or more virtual machine images. The application module 204 may access an application installation copy (e.g., distribution disks, distribution CDs, distribution DVDs, and installation programs) to retrieve the necessary files to be placed within the virtual machine image. For example, the application module 204 may copy files, directories, and other data from the application installation copy to be used within the virtual machine image generated by the image creation module 202.

In some embodiments, at least one application is installed on a host device, such as a computer. The application module 204 may retrieve the files, directories, and/or other data of the application from the host machine for the virtual machine image. The application module 204 may also provide files, directories, and/or other data from the host device while removing other files, directories, and/or other data.

The application module 204 may remove key codes, usernames, settings, or other personalized information required for application installation on the host device, but not necessary or inappropriate for provision in the virtual machine image. For example, an instance of an application such as MICROSOFT OFFICE® may include user-specific or company-specific identifications or settings, such as a name. These identifications are referred to herein as personal information. The image creation module 202 may optionally remove such personal information during generation of the virtual machine image 104A. The application module 204 may also be configured to provide files, directories, and/or other data as needed.

An application may also include files related to an operating system (e.g., operating system files), such as WINDOWS NT Server 4.0® or LINUX®. For example, if an instance of MICROSOFT OFFICE includes operating system files related to WINDOWS NT Server 4.0, generating a virtual machine image may include removing one or more operating system files before generating the virtual machine image.

Those skilled in the art will appreciate that there are many ways for the application module 204 to provide one or more applications for one or more virtual machine images.

The data module 206 may similarly provide data (e.g., personalized settings) to the virtual machine image generated by the image creation module 202. In some embodiments, the data module 206 provides files such as word processing files, excel spreadsheets, and the like. Further, the data module 206 may provide personalized settings. In one example, when a host device is coupled to a network, the host device contacts the data module 206. The data module 206 may then receive or retrieve files or settings from the host device and update one or more virtual machine images.

Those skilled in the art will appreciate that there are many ways for the data module 206 to provide data for one or more virtual machine images.

In various embodiments, the image creation module 202 on the server 102 generates one or more virtual machine images. In various embodiments, the image creation module 202 can generate the virtual machine image 104A as a packed, single large disk image file, or alternatively the virtual machine image 104A may include a plurality of discrete image files.

Individual host devices may be configured by a plurality of virtual machine images. In one example, there may be hierarchy of virtual machine images. One virtual machine image may comprise a "company standard" that all host devices of a company must receive (e.g., MICROSOFT OFFICE and any other customized applications that all computers in the company require). Another set of virtual machine images may comprise a "department standard" which includes all applications required for a department. For example, the accounting department may require one or more accounting applications. In another example, the engineering department may require CAD applications. The server may provide the "company standard" image as well as the "department standard" image to configure the host device in a specific department.

In various embodiments, one set of virtual machine images include "personalized settings" comprising at least one virtual machine image for one or more users. For example, a virtual machine image may comprise settings for an individual user's host device. The settings may include desktop images, power settings, shortcuts, macros, and the like. Each individual user may have separate settings and have an associated virtual machine image.

In some embodiments, certain settings may be required for groups of users. In one example, the server may provide the "company standard," "department standard," "group setting," and "personalized settings" virtual machine images to configure one or more host devices. In various embodiments, when the host device is configured based on multiple virtual machine images, the host device receives multiple applications but only a single virtual machine. Those skilled in the art will appreciate that there may be any number of images organized in any manner to configure one or more computers in any organization.

In various embodiments, a single virtual machine image may be generated based on other virtual machine images. For example, the image creation module 202 may generate a virtual machine image for an employee from the "company standard," "department standard," "group setting," and "personalized settings" virtual machine images. The virtual machine image may be generated from the other virtual machine images upon, for example, request for an update or an initial provisioning of to the host device. When a host device is initially provisioned, the host device may be provided a virtual machine image for the first time (e.g., the host device is new) or after the host device has been significantly altered (e.g., a significant portion of the memory of the host device has been erased). In other embodiments, the image creation module 202 may create virtual machine images based on prior virtual machine images and data provided from the application module 204 and/or the data module 206. Those skilled in the art will appreciate that there are many ways in which to generate virtual machine images.

The application module 204 and the data module 206 may operate together with the image creation module 202 to create each virtual machine image or set of virtual machine images. In one example an administrator may centrally create, manage, and organize the virtual machine images.

The image storage module 208 stores one or more virtual machine images. The image storage module 208 may comprise one or more data structures (e.g., databases) and/or one or more computer readable media (e.g., hard disks, CDs, DVDs, tape, flash memory etc.) In various embodiments, the image storage module 208 is a virtual data structure that is associated with data on multiple digital devices.

In various embodiments, the image storage module 208 also provides storage capabilities for one or more other modules, such as the image creation module 202, the application module 204, and the data module 206. The image storage module 208 facilitates providing the virtual machine image to the server 102 so that the copy (or components thereof) of the virtual machine image can be provided to the host device.

The image distribution module 210 distributes the virtual machine images (or components thereof) to one or more host devices. When a host device is first configured with a virtual machine image, an administrator may command the image storage module 208 to provide one or more virtual machine images. In one example, the administrator selects a variety of virtual machine images such as a "company standard" virtual machine image and a "department standard" virtual machine image and associates the selections with a host device or user of the host device.

The administrator may associate the virtual machine image(s) with an IP address of the host device, a MAC address, UUID, or any other host machine identifier. Alternately, the administrator may associate the virtual machine image(s) with user information (e.g., a username, password, encryption key, or biometric information) required to be provided by the user and/or the host device before the virtual machine image configures the host device. In some embodiments, the virtual machine image is associated with both the host device (e.g., via a UUID) and a user (e.g., via a password).

The user information may be provided by logging into the server 102, logging into the device, or even logging into the operating system of the host device. In one example, some digital devices include a biometric reader or require input associated with a smart card prior to allowing access to data and/or a network. This user information may be provided to the server 102 for authentication. In another example, the login information (username and password) for access to a WINDOWS system or provided to a NOVELL system is provided to the server 102. Those skilled in the art will appreciate that there are many ways for user information to be provided to the server 102.

In various embodiments, a host device may receive one or more virtual machine, images, components of one or more virtual machine images, or updates from a virtual machine image when the host device couples to a network in communication with the server 102. In one example, the host device contacts the server 102. The server 102 may identify the host device and/or authenticate the host device (e.g., via an encryption key or user password). The server 102 may then transmit any virtual machine images (or components thereof) that have been updated since the last connection between the server 102 and the host device. Alternately, the server 102 may poll the host device to reconcile any difference between the configuration of the host device and one or more virtual machine images.

Once the host device has been configured by the virtual machine image(s), the host device need no longer be online. The host device may be offline and operate as configured. When the host device is offline, the host device may not be coupled to any network, not coupled to a network in communication with the server 102, or merely not logged onto the server 102.

The encryption module 212 optionally encrypts the virtual machine image(s) and/or communication between the server 102 and the network 106 (e.g., communication provided by the network module 214 discussed herein). In one example, the encryption module 212 may encrypt the communication between the server 102 and the host device via SSL.

The encryption module 212 may encrypt the virtual machine image 104 based on a key pair. Each host device may comprise an encryption key that is required to decrypt the virtual machine image(s) or components thereof.

In various embodiments, a host device digitally signs a virtual machine image update request which is received and authenticated by the encryption module 212. Once the digital signature is authenticated, the image distribution module 210 may provide the virtual machine image(s) to configure the host device.

Any encryption method or algorithm may be employed and fall within the scope of the various embodiments. For example, the encryption module 212 may use encryption methods or algorithms based on private keys, private keys and public keys, hash functions and/or hash tables. The system administrator can use the image creation module 202 to direct the encryption module 212 to encrypt the virtual machine image(s). When the host device receives the copy of the virtual machine image that has been encrypted, it may use decryption software (not shown) to decrypt the copy of the virtual machine image.

The network interface 214 provides communication between the server 102 and the network 106 (see FIG. 1). The network interface 214 may be configured to use any network protocol or standard.

In other embodiments, a compression module (not depicted) may compress the virtual machine image(s) within the image storage module 208. In another example, the compression module may compress at least some of the components of one or more virtual machine images.

Although the server 102 is described as comprising various modules, such as the image creation module 202, the server 102 may comprise fewer or more modules and still fall within the scope of various embodiments. In one example, the application module 204 and the data module 206 are combined in a single module. In another example, the encryption module 212 is optional.

Figure 3:
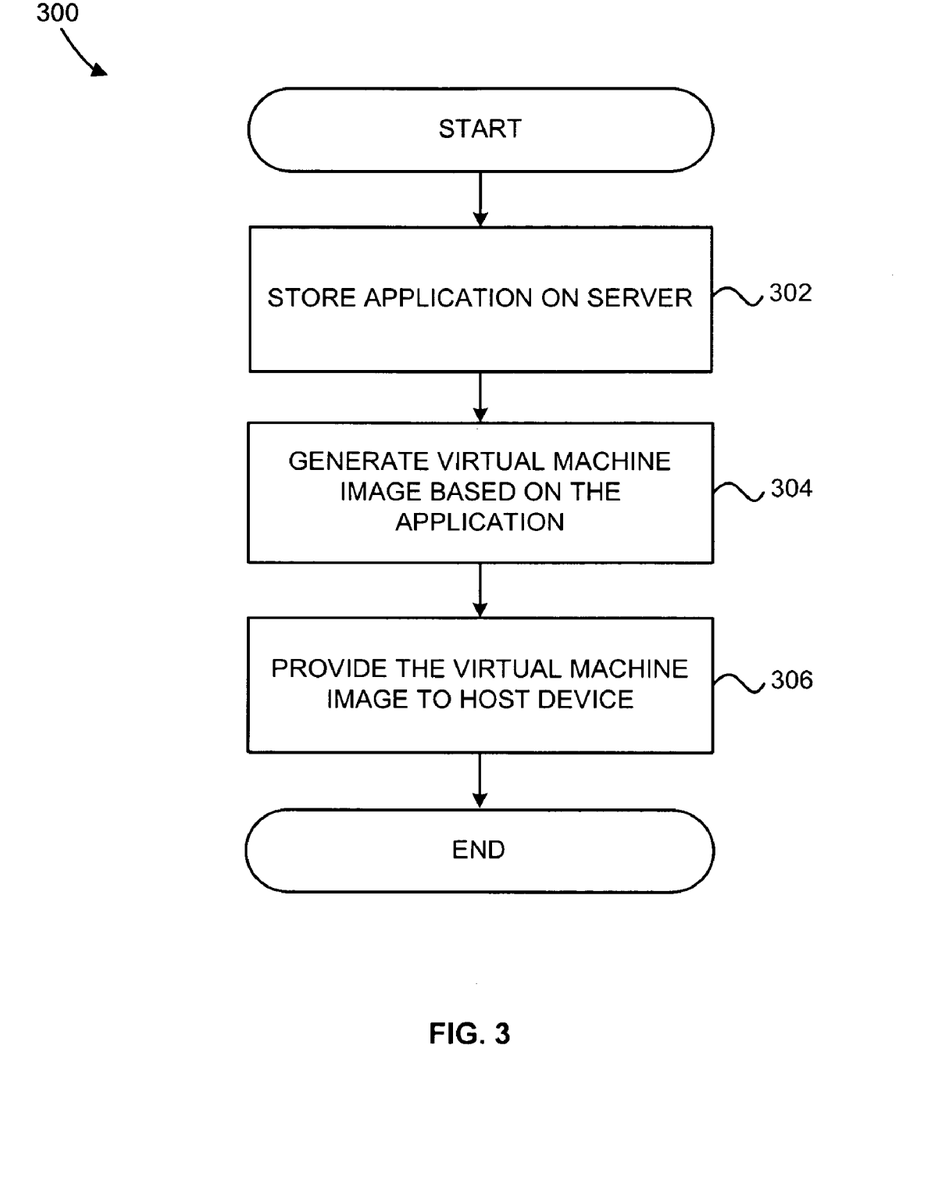
FIG. 3 is a flowchart depicting a method of providing decentralized computing using a host device, according to various embodiments.

FIG. 3 is a flowchart depicting a method of providing a copy of a virtual machine image, according to various embodiments. In an exemplary embodiment, a system administrator, an information technology (IT) staff member at a company or, generally, any user with privileges to access the server 102, employs the image distribution module 210 to provide the copy of the virtual machine image to the host device.

In step 302, a system administrator, IT staff member, or other user with privileges to access the server 102, optionally stores an application on the server 102. In various embodiments, the application is provided to the server 102 without storing. For example, a host device such as a computer with the application installed may be in communication with the server 102. The application module 204 may provide one or more files, directories, and/or other data from the host device to the image creation module 202. The application module 204 may remove some or all personalized settings or operating system files from the application on the host device as well.

An optimal configuration may be created. The optimal configuration may include applications, resources, and personalized settings. In some embodiments, a template or model of the optimal configuration is created. The optimal configuration is a configuration that may include one or more applications and support resources for a type of user. A type of user may be defined by the applications, resources, and settings a user may need. In one example, one type of user is an employee of an accounting department that uses accounting programs as well as office productivity programs. Another-type of user is an engineer which may need engineering programs as well as office productivity programs. Types of users may be divided and/or determined based on business department, software needs, access to resources, authorized access, and/or any other kind of division.

The optimal configuration may also comprise hardware drivers for specific resources the type of user may have access to (e.g., a printer driver, a scanner driver, a display driver, and a mouse driver). In some embodiments, the optimal configuration may also include personalized settings (e.g., screen resolution, a background image, macros, backup routines, and data structures for storing data) based on a particular user, type of user, and/or user need.

Once the optimal configuration is created, the image creation module 202 may generate one or more virtual machine image(s) based on the optimal configuration. In various embodiments, the image creation module 202 generates virtual machine image(s) comprising instructions, files, and/or directories associated with applications, drivers, and user settings. In one example, the image creation module 202 generates the image including files associated with an application. The files associated with an application may include all files within an application folder or subdirectory within the digital device as well as any operating system files (e.g., dynamic link libraries (.dll)) necessary to run the application that may not be present within the host device.

The image creation module 202 may generate the virtual machine image comprising drivers (e.g., printer drivers that are available to a user or type of user) as well as user settings (e.g., customizations for the hardware or software of the digital device). The virtual machine image may also comprise virtual peripherals and resources that may be operated by the virtual machine.

In various embodiments, the image creation module 202 may also generate instructions which may command the virtual machine manager to load the virtual machine image. In one example, the virtual machine manager may load the virtual machine image on the host device by placing some files from the virtual machine image into an application directory.

In other embodiments, the virtual machine image comprises a disk image. In one example, the virtual machine manager may load the disk image which includes one or more data structures (e.g., directory structure) as well as the files. By loading the disk image, the directories, subdirectories, folders, and files are placed on the host device. In this example, there may be no need for the image distribution module 210 to generate instructions to command the virtual machine manager regarding the loading of the virtual machine image.

Those skilled in the art will appreciate that the virtual machine image may not include an operating system or operating system files that are not related to the application, the drivers, or the user settings. For example, the virtual machine manager may copy files from the virtual machine image to locations within the existing operating system on the host device 108.

After generating the virtual machine image, the image creation module 202 may store the virtual machine image in the image storage module 208. In some embodiments, the image creation module 202 associates users, types of users, and/or digital devices (e.g., host devices) with one or more virtual machine images.

In step 306, the server 102 provides the virtual machine image configured to the host device. In one example, the host device communicates with the server 102 over a virtual private network (VPN). The host device and/or the user are authenticated and one or more virtual machine images associated with the host device and/or the user are selected. The selected one or more virtual machine images are then provided to the host device. After the host device is configured by the virtual machine image(s), the host device may execute the virtual machine and any applications contained within the virtual machine image(s). The application(s) may include one or more productivity software programs and/or tools such as MICROSOFT OFFICE, web browsers, anti-virus software, security software, and the like. In various embodiments, the host device may be subsequently decoupled from the server 102 (e.g., the host device may be offline) and execute the virtual machine and any applications provided by the virtual machine image(s).

Figure 4:
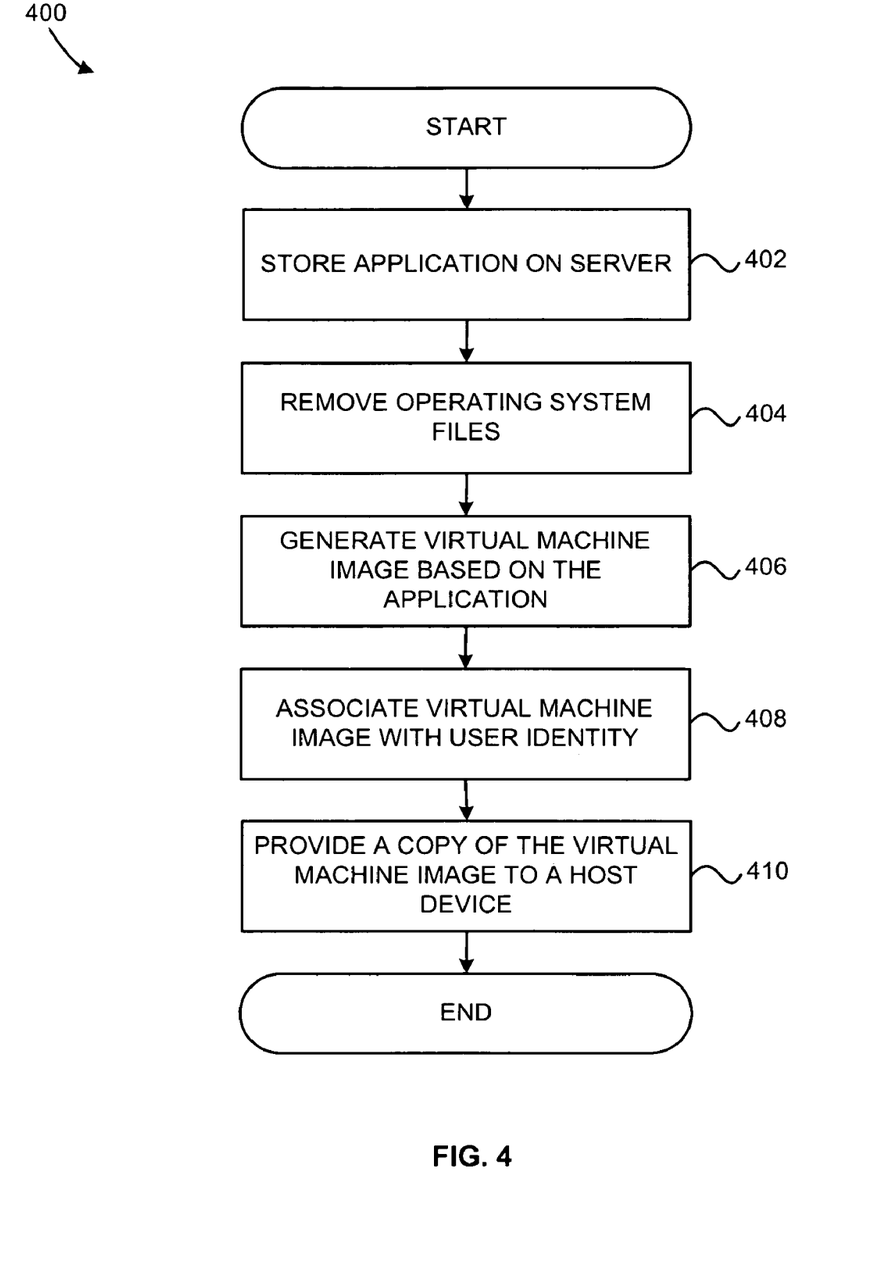
FIG. 4 is a flowchart depicting methods of providing a virtual machine image to a host device, according to various embodiments.

FIG. 4 is a flowchart depicting methods of providing a virtual machine image to a host device, according to various embodiments. In step 402, an application is stored or provided to the server 102. In some embodiments, the application is stored in the application module 204 or the image storage module 208.

In step 404, operating systems files are removed from the application. In various embodiments, the application is installed on a digital device. The application module 204 and/or the data module 206 may provide the application to the image creation module 204. The application module 204 may remove unnecessary files such as operating system files and/or personalized settings before providing the application (e.g., files, directories, and/or other data associated with the application on the digital device) to the image creation module 202.

In some embodiments, the data module 206 also provides files, directories, and/or other data to the image creation module. These files, directories, and/or other data may provide for personalized settings, documents, images, registry entries, and any other resource or data that may be provided by the virtual machine image.

In step 406, the image creation module 202 generates the virtual machine image based on the application and any other files, directories, and/or other data provided by the application module 204 and the data module 206. In some embodiments, the image creation module 202 generates the virtual machine image(s) as a packed, single large disk image file, or alternatively, the virtual machine image(s) may include a plurality of discrete disk image files. In some embodiments, the virtual machine image(s) are generated based on the host device and/or user intended to execute the virtual machine image(s).

In optional step 408, the virtual machine image(s) is/are associated with one or more users of host device(s). A table, database, or other data structure may associate users and/or digital devices with one or more virtual machine images. In some embodiments, a user may be provided with the copy of virtual machine image that has been specifically generated to provide the user with one or more applications and files including a particular suite or set of software programs and tools. By associating a virtual machine image with a user, the server 102 and the image storage module 208 can store different virtual machine images that provide different suites or sets of software programs and tools to different users.

In step 410, a virtual machine image or a copy of the virtual machine image is provided to the host device. The host device may be a workstation or thin client. In one example, the host device comprises a processor and flash memory with an operating system installed. Memory may comprise any static memory (e.g., hard drive, tape, CD, DVD, flash), dynamic memory (RAM) or any combination thereof. As described with reference to FIG. 1, the copy of the virtual machine image 104B can be provided as described herein using network 106.

Figure 5:
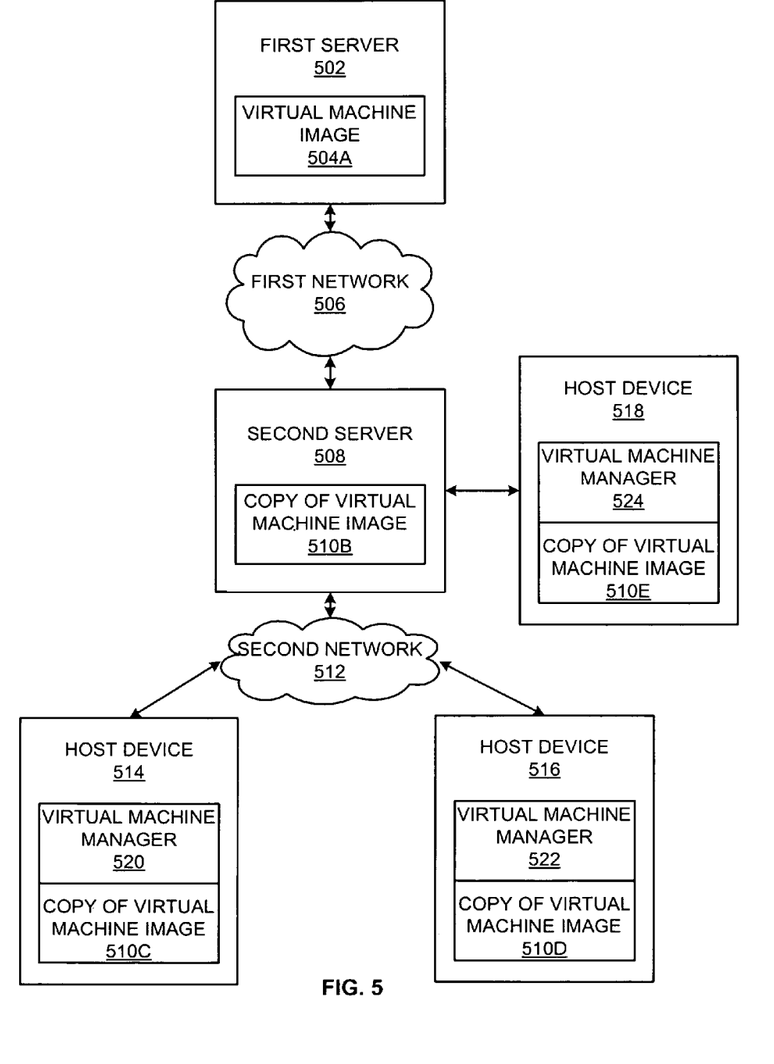
FIG. 5 is a block diagram depicting an example of an exemplary implementation using a second network, according to various embodiments.

FIG. 5 is a block diagram depicting an example of an exemplary implementation using a second network, according to various embodiments. An exemplary implementation includes a first server 502 coupled to a first network 506 and a second server 508 coupled to both the first network 506 and a second network 512. Host devices 514 and 516 are also coupled to the second network 512 and are in communication with the second server 508. A host device 518 is coupled to the second server 508. The first server 502 and the second server 508 comprise the virtual machine image 504A and the copy of the virtual machine image 510B, respectively. The host devices 514, 516, and 518 comprise virtual machine managers 520, 522, and 524, respectively, and copies of the virtual machine images 510C, 510D, and 510E, respectively.

Although FIG. 5 depicts three of host devices 514, 516, and 518 for simplicity, there may be any number of the host devices in exemplary embodiments in communication with the first network 506, the second network 512, the first server 502, and/or the second server 508. Further, there may be any number of servers and networks.

In various embodiments, the first server 502 generates the virtual machine image 504A. A copy of the virtual machine image 510B may be provided to the second server 508 and any other servers or host devices in communication with the first server 502.

In various embodiments, the first server 502 may operate as the primary generator and repository of virtual machine images. Updates and patches to applications or data may be provided to one or more virtual machine images within the first server 502. The first server 502 may then "push," distribute, or otherwise provide the virtual machine images (or copies) to one or more other servers (e.g., the second server 508) for distribution to the host devices.

The second server 508 may reconcile any changes between the coy of the virtual machine image 510B with the host devices 514, 516, and 518. Updates or changes may be provided to the first server 502 which may then add one or more of the updates and changes to one or more virtual machine images. For example, a user of the host device 514 may have created any number of documents using applications provided from a virtual machine image when offline. When the host device 514 is coupled to the second server 508 via the second network 512, the host device 514 may provide the documents and any other settings to be included in one or more virtual machine images associated with the host device 514 and/or the user of the host device 514. These changes may be directly incorporated into one or more copies of the virtual machine images and provided to the first server 502. The first server 502 may, for example, store the updated copies of the virtual machine images, make a determination of whether to keep the changes, identify the changes to an administrator, discard the virtual machine images, or distribute the changes to other virtual machine images.

In some embodiments, the second server 508 may be an "Edge" server that is configured to store partially or fully cached copies of the virtual machine image 510B. Once stored on the second server 508, a user may be provided the copy of the virtual machine image 510B.

An "Edge" server may be located in the data center, or it may be located in a remote location, potentially closer to the user, such as in a branch office of a company. This configuration of the second server 502 may be appropriate when the network 106 does not provide sufficient speed to provide the application when requested by a user. The second server 502 may also provide a backup capability for the copy of the virtual machine image 104B.

A system administrator (or other user with privileges to access server 102) may maintain or manage patches or changes to the virtual machine image 504A and the copy of the virtual machine image 510B. For example, a system administrator may periodically replicate changes in the virtual machine image 504A to one or more of the host devices.

Figure 6:
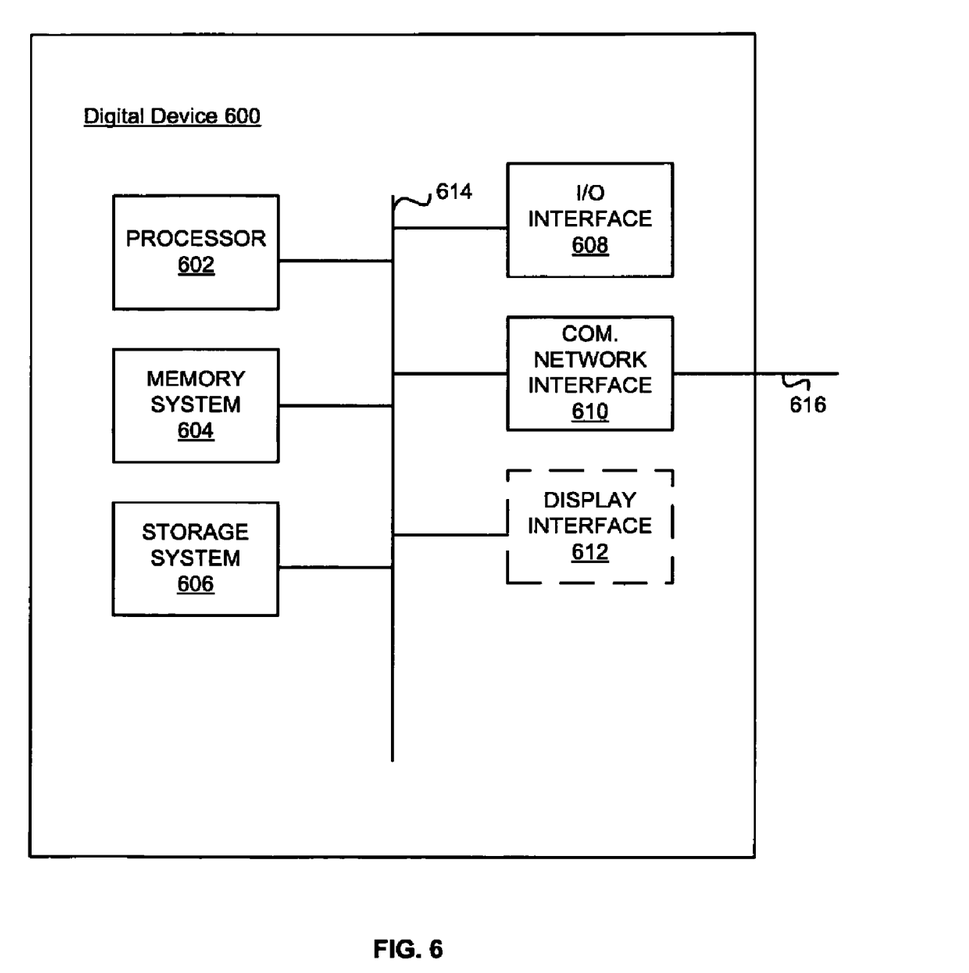
FIG. 6 is a block diagram of a server in an exemplary implementation of the invention.

FIG. 6 is a block diagram of the digital device 600 in an exemplary implementation of the invention. In various embodiments, the digital device 600 comprises the server 102 or the host devices 108, 110, or 112. The digital device 600 comprises a processor 602, a memory system 604, a storage system 606, an input/output ("I/O") interface 608, a communication network interface 610, and an optional display interface 612 which are all coupled to a system bus 614. The processor 602 is configured to execute executable instructions. In some embodiments, the processor 602 comprises one or more circuits and/or multiple computation devices capable of processing the executable instructions.

The memory system 604 is any memory configured to store data. Some examples of the memory system 604 are storage devices, such as RAM, ROM, or flash memory. The optional storage system 606 is any storage configured to persistently store data (e.g., static memory). Some examples of the storage system 606 are include, but is not limited to, flash drives, hard drives, optical drives, and/or magnetic tape. The memory system 604 and/or the storage system 606 can include the data module 206 and image storage module 208 described with reference to FIG. 2. Computer readable medium may comprise all or some of the memory system 604, the storage system 606, or a combination of the memory system 604 and the storage system 606.

The I/O interface 608 is any device that can receive input from a system administrator or a user. The I/O interface 608 can couple to a keyboard, touchscreen, mouse, keypad, printer, scanner, or any other input or output device.

The communication network interface 610 comprises the network interface 210 described with reference to FIG. 2, and can couple to the network 106 described with reference to FIG. 1. The coupling 616 may comprise a link to allow communication with any network including network 106. Moreover, the communication network interface 610 may support communication over many kinds of connections, including, but not limited to, a USB connection, a firewire connection, an Ethernet connection, a serial connection, and/or a parallel connection. The communication network interface 610 may also support wireless communication (e.g., 802.11a/b/g/n or wireless USB). It will be apparent to those skilled in the art that the communication network interface 610 can support many wired and wireless standards.

The optional display interface 612 is any device that can control a display device. A display device can be a monitor, screen, LCD, flatscreen, or any device configured to display information.

The above-described modules can be comprises of instructions that are stored on storage media. The instructions can be retrieved and executed by the processor 602. Some examples of instructions include software, program code, and firmware. Some examples of storage media comprise memory devices and integrated circuits. The instructions are operational when executed by the processor 602 to direct the processor 602 to operate in accordance with embodiments of the present invention. Those skilled in the art are familiar with instructions, processor(s), and storage media.

The embodiments discussed herein are illustrative of examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

What is claimed is:

1. A method for providing decentralized computing, the method comprising:
   generating one or more virtual machine images, the one or more virtual machine images comprising at least one application and a virtual machine, wherein generating the one or more virtual machine images comprises removing personal information and an operating system file from the at least one application;
   associating the one or more virtual machine images with user information;
   receiving user information from a host device, the host device comprising a virtual machine manager;
   selecting one or more of the associated virtual machine images based on the user information; and
   providing the selected one or more of the associated virtual machine images to the host device, wherein the selected one or more of the associated virtual machine images configure the host device to locally execute the at least one application via the virtual machine manager.

2. The method of claim 1, wherein the host device further comprises a processor and a memory containing an operating system.

3. The method of claim 1, further comprising encrypting the one or more virtual machine images.

4. The method of claim 1, wherein providing the selected one or more of the associated virtual machine images to the host device comprises encrypting the communication to the host device.

5. The method of claim 1, wherein providing the selected one or more of the associated virtual machine images to the host device comprises configuring the host device to execute the at least one application via the virtual machine when the host device is offline.

6. The method of claim 1, further comprising authenticating the user information.

7. The method of claim 1, further comprising updating the selected one or more of the associated virtual machine images with at least one document received from the host device.

8. A non-transitory computer readable storage medium having embodied thereon instructions executable by a processor, the instructions containing a method for providing decentralized computing, the method comprising:
   generating one or more virtual machine images, the one or more virtual machine images comprising at least one application and a virtual machine, wherein generating the one or more virtual machine images comprises removing personal information and an operating system file from the at least one application;
   associating the one or more virtual machine images with user information;
   receiving user information from a host device, the host device comprising a virtual machine manager;
   selecting one or more of the associated virtual machine images based on the user information; and
   providing the selected one or more of the associated virtual machine images to the host device, wherein the selected one or more of the associated virtual machine images configure the host device to locally execute the at least one application via the virtual machine manager.

9. The non-transitory computer readable storage medium of claim 8, wherein the host device comprises a processor and a memory containing an operating system.

10. The non-transitory computer readable storage medium of claim 8, said instructions further comprising encrypting the one or more virtual machine images.

11. The non-transitory computer readable storage medium of claim 8, wherein providing the selected one or more of the associated virtual machine images to the host device comprises encrypting the communication to the host device.

12. The non-transitory computer readable storage medium of claim 8, wherein providing the selected one or more of the associated virtual machine images to the host device comprises configuring the host device to execute the at least one application via the virtual machine when the host device is offline.

13. The non-transitory computer readable storage medium of claim 8, further comprising authenticating the user information.

14. The non-transitory computer readable storage medium of claim 8, further comprising updating the selected one or more of the associated virtual machine images with at least one document received from the host device.

15. An apparatus, comprising:
   a network interface;
   a processor; and
   memory storing computer readable instructions that, when executed by the processor, cause the apparatus to provide decentralized computing by:
      generating, by an image creation module, one or more virtual machine images, the one or more virtual machine images comprising at least one application and a virtual machine, wherein generating the one or more virtual machine images comprises removing personal information and an operating system file from the at least one application;
      associating, by the image creation module, the one or more virtual machine images with user information;
      receiving, via the network interface, user information from a host device, the host device comprising a virtual machine manager;
      selecting, by an image distribution module, one or more of the associated virtual machine images based on the user information; and
      providing the selected one or more associated virtual machine images to the host device, wherein the selected one or more associated virtual machine images configure the host device to locally execute the at least one application via the virtual machine manager.

* * * * *